United States Patent
Guthmann et al.

(10) Patent No.: US 6,843,170 B1
(45) Date of Patent: Jan. 18, 2005

(54) ACTUATING MECHANISM FOR THE FUNCTIONAL ELEMENTS IN A ROUND BALER

(75) Inventors: Peter Guthmann, Metz (FR); Arséne Roth, Gray (FR)

(73) Assignee: Usines Class France, Woippy (FR)

( * ) Notice: Subject to any disclaimer, the term of this patent is extended or adjusted under 35 U.S.C. 154(b) by 151 days.

(21) Appl. No.: 09/654,149

(22) Filed: Sep. 1, 2000

(30) Foreign Application Priority Data

Sep. 1, 1999 (DE) .......................................... 199 41 604

(51) Int. Cl.[7] .............................. B30B 5/06; A01D 39/00
(52) U.S. Cl. ............................. 100/35; 100/88; 56/341; 292/341.15
(58) Field of Search ............................. 100/35, 87, 88, 100/89; 53/118, 587; 56/341, 342, 343, 344; 292/118, 119, 341.15, 341.17

(56) References Cited

U.S. PATENT DOCUMENTS

| | | | | |
|---|---|---|---|---|
| 4,389,930 A | * | 6/1983 | Rutschilling | 100/88 |
| 4,407,190 A | * | 10/1983 | Cheatum | 100/88 |
| 4,545,298 A | * | 10/1985 | Viaud | 100/88 |
| 4,557,189 A | * | 12/1985 | Schaible | 100/13 |
| 4,770,093 A | * | 9/1988 | Gunther et al. | 100/88 |
| 5,134,839 A | * | 8/1992 | Clostermeyer et al. | 100/88 |
| 5,598,690 A | * | 2/1997 | McClure et al. | 56/341 |
| 5,826,418 A | * | 10/1998 | Clostermeyer et al. | 100/88 |

FOREIGN PATENT DOCUMENTS

| | | |
|---|---|---|
| DE | 31 18 663 | 10/1984 |
| DE | 39 41 707 | 6/1991 |
| EP | 0 130 258 | 12/1986 |

* cited by examiner

*Primary Examiner*—Allen Ostrager
*Assistant Examiner*—Jimmy Nguyen
(74) *Attorney, Agent, or Firm*—Husch & Eppenberger, LLC; Robert C. Haldiman; David A. Chambers

(57) ABSTRACT

An actuating mechanism for the functional elements in a round baler for agricultural crops includes a tensioning arm which is provided with guide rollers and a pivotal arm and which is pivoted on the frame of the baler via a hydraulic cylinder. The hydraulic cylinder is arranged between the pivotal arm and a first arm of a bell crank, which is pivotally mounted on the tailgate. A second arm of the bell crank is selectively engageable with the front part of the housing.

20 Claims, 3 Drawing Sheets

ACTUATING MECHANISM FOR THE FUNCTIONAL ELEMENTS IN A ROUND BALER

BACKGROUND OF THE INVENTION

The present invention relates generally to agricultural machinery and, more particularly, to improvements to balers for harvested crops. Various hydraulically controlled devices for actuating the functional elements of a round baler are generally known.

Hydraulic cylinders and their associated control devices are used in round balers for pivoting the baler's tail gate into the bale ejecting position or into the baling position. Hydraulic cylinders and their associated control devices are also used for actuating the locking mechanism for the tailgate and for controlling the tensioning arm for the rotating belts. In the majority of cases, either a separate hydraulic cylinder is employed for each individual means requiring actuation or a separate hydraulic cylinder is employed for complicated combinations of such means to effect a plurality of actuating functions. Such arrangements give rise to very high manufacturing costs.

Round balers such as the one disclosed in EP 0 130 258 B1, are also known to comprise a fixed housing part having a tail gate pivotally mounted thereon and a plurality of circulating belts disposed around the periphery of the baling chamber. The path followed by these belts is adapted to the diameter of the round bale by means of a number of guide rollers arranged on a tensioning arm. In these balers, the pivoting of the tailgate and that of the tensioning arm is effected with the aid of a common hydraulic cylinder, which is connected to these two components and also to an appertaining hydraulic control device. However, this arrangement is not suitable for high performance balers, which regulate bale densities, as no locking mechanism is provided between the tailgate and the frontal housing.

The present invention is directed to overcoming one or more of the problems set forth above.

SUMMARY OF THE INVENTION

An object of the invention is to provide an actuating mechanism for a plurality of functional elements in such a manner that the necessary manufacturing costs are reduced, while a high degree of functional reliability and good performance levels are achieved.

In one aspect of this invention there is provided a round baler for bailing harvested crops and having a baling chamber surrounded by a two-part housing of which a front part is rigidly connected to a frame of the baler while a rear part is in the form of a pivotal tailgate is disclosed. The improvement includes an actuating mechanism having a plurality of belts and rollers disposed adjacent to one another within the baling chamber for enabling baling chamber size to vary when pivoted, and a tensioning arm provided with guide rollers and a pivotal arm, wherein the tensioning arm is pivotally mounted on the frame of the baler via a hydraulic cylinder arranged between the pivotal arm and a first arm of a bell crank, wherein the first end of a bell crank is pivotally mounted on a side wall of the baler's tailgate, and wherein a second arm of the bell crank is engageable with a frontal part of the housing.

In another aspect of this invention there is provided a method for bailing harvested crops utilizing a round baler having a baling chamber surrounded by a two-part housing of which a front part is rigidly connected to a frame of the baler while a rear part is in the form of a pivotal tailgate is disclosed. The method includes pivoting an actuating mechanism having a plurality of belts and rollers disposed adjacent to one another within the baling chamber to vary baling chamber size, pivotally mounting a tensioning arm, having guide rollers and a pivotal arm, on the frame of the baler via a hydraulic cylinder arranged between the pivotal arm and a first arm of a bell crank, pivotally mounting the first arm of a bell crank on a side wall of the baler's tailgate, and selectively engaging a second arm of the bell crank with a frontal part of the housing.

The number of hydraulic cylinders needed for actuating the various functional elements is reduced and hence the costs in the manufacture of the actuating mechanism are substantially lowered as a result of the interlinking or combining of functions and sequences of movements.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
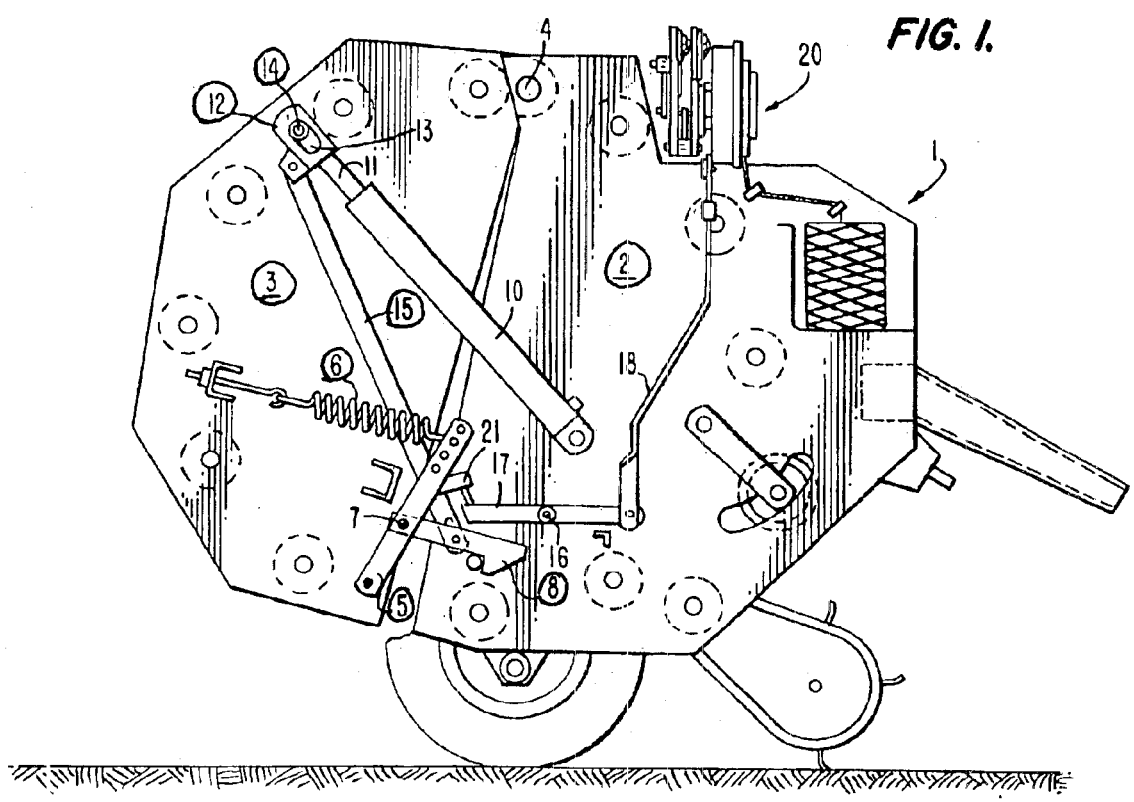
FIG. 1 is a schematic longitudinal sectional view of a round baler in its starting position prior to a baling action.

Referring now to the drawings, and initially to FIG. 1, a round baler 1 is pulled by a tractor, which is not shown in the figures, and the functional elements of the round baler 1 are actuated by the tractor via mechanical and hydraulic drive means. The swathes of crop are picked-up from the ground 5 by a pick-up drum 4 which is located in front of the baler's running wheels 2 and is guided by the support wheels 3. The crop is supplied to the baling chamber 7 via a feed roller 6. The baling chamber 7 is surrounded by a two-part housing whose front part 8 is rigidly connected to the frame 9 of the baler and whose rear part is in the form of an upwardly pivotal tail gate 10. A plurality of circulating flat belts 11 are disposed adjacent to one another within the baling chamber 7 around its periphery. These belts are guided over a plurality of drive rollers 12, 13 and nondriven guide rollers 14, 15. For the purposes of matching the tension of the belts 11 and the path followed thereby to the changing diameter of the round bale 16 during the baling process, tensioning arms 18 pivotal about a pivotal axis 17 are disposed on each side of the frame 9 of the baler. A plurality of guide rollers 14, 14 are mounted on the tensioning arms 18.

Figure 2:
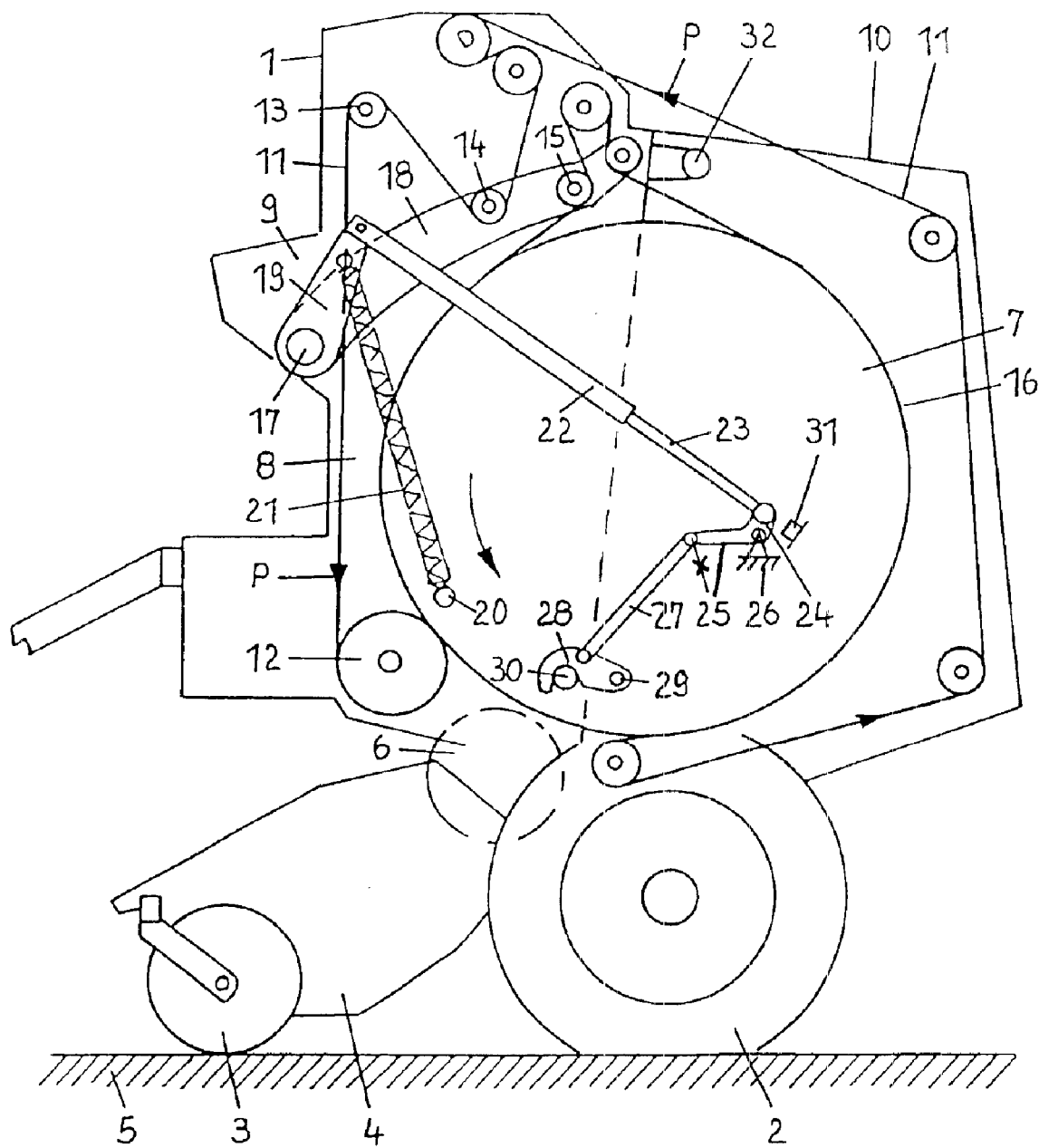
FIG. 2 is a longitudinal sectional view of the round baler including a round bale shortly before it attains its final size.
Figure 3:
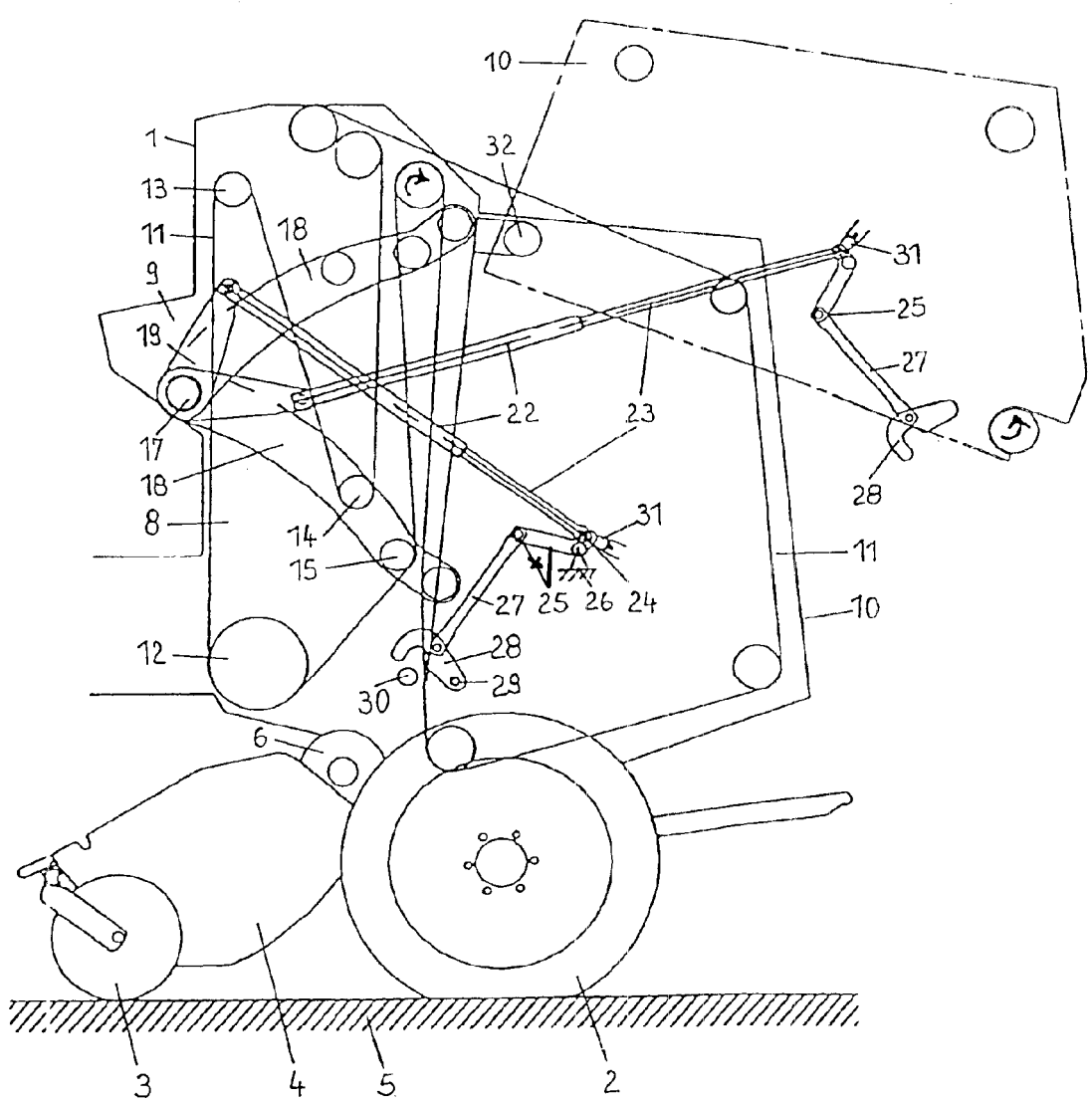
FIG. 3 is a longitudinal sectional view of the round baler after the baling action has finished and the locking mechanism for the tail gate has been released, wherein the upper pivoted position of the tail gate is illustrated by the dash-dotted lines.

Referring now to FIG. 2, the tensioning arms 18 pivot upwardly about the axis 17 in accordance with the increasing diameter of the round bale 16, thereby matching the guiding arrangement for the belts 11 to the actual circumference of the round bale 16. Pivotal arms 19 are connected to the tensioning arms 18 to rotate therewith. A tension spring 21 for pulling the tensioning arm 18 into its lower end position at the beginning of the baling action is arranged between the pivotal arm 19 and a fixed mounting point 20 on the baler frame 9. The belts 11 are thereby placed in the requisite starting position for the baling process. A hydraulic cylinder 22 is mounted in a pivotal manner on the free end of the pivotal arm 19. The piston rod 23 of the hydraulic cylinder 22 is connected to an arm 24 of a double-armed bell crank 25. The bell crank 25 is pivotally mounted on a bearing 26 located on the sidewall of the tailgate 10. The other arm 27 of the bell crank 25 is connected to a latch or pawl 28, which is pivotal about an axis 29 in the lower region of the tailgate 10. The pawl 28 engages a fixed spigot or keeper 30, located on the frontal housing part 8. The tailgate 10 is thereby firmly locked to the frontal housing part 8 during the baling process. The force effective on the pawl 28 increases proportionately with the upward pivoting of the tensioning arm 18 as the diameter of the round bale 16 increases during the course of the baling action. Thus, the greatest locking force will occur at the heaviest load levels, thereby ensuring that the tailgate 10 will always be positively locked to the frontal housing part under any circumstances. Once the final size for the round bale 16 has been attained, pressure is applied to the hydraulic cylinder 22 so as to drive out the piston rod 23 and pivot the bell crank 25 towards a fixed stop 31 located below the arm 24 of the bell crank 25, as shown in FIG. 3. As a result, the pawl 28 is drawn upwardly, thereby releasing the locking mechanism to provide selective engagement. The tail gate 10 is thereupon pivoted upwardly about the pivotal axis 32 by the effective torque provided by the hydraulic cylinder 22 so as to release the round bale 16 which is then deposited on the ground 5. Once the bale has been expelled, pressure is again applied to the hydraulic cylinder 22 to pull the piston rod 23, thereby pivoting the tail gate 10 downwardly and causing the belts 11 to return to their starting position so that a new baling process can begin. The controlling of each of the functional elements is effected exclusively by means of the hydraulic cylinder 22. The directions of rotation or movement of the rollers and belts 11 are indicated in the drawing by means of the arrows P.

Other objects, features, advantages and applications will be apparent to those skilled in the art. While preferred embodiments of the present invention have been illustrated and described, this has been by way of illustration and the invention should not be limited except as required by the scope of the appended claims.

What is claimed is:

1. In a round baler for bailing harvested crops and having a baling chamber surrounded by a two-part housing of which a front part is rigidly connected to a frame of the baler while a rear part is in the form of a pivotal tailgate, the improvement comprising an actuating mechanism having a plurality of belts and rollers disposed adjacent one another within the baling chamber for enabling baling chamber size to vary when pivoted, and a tensioning arm provided with guide rollers, a pivotal arm connected to the tensioning arm, wherein the tensioning arm is pivotally mounted on the frame of the baler, a hydraulic cylinder operatively engaging the pivotal arm and a first arm of a bell crank, wherein a fulcrum of the bell crank is pivotally mounted on a side wall of the baler's tailgate, and wherein a second arm of the bell crank is operatively engageable with a locking mechanism engageable with the frontal part of the housing and means for increasing a locking force on the locking mechanism as a bale in the baling chamber increases in size.

2. A round baler according to claim 1, wherein the actuating mechanism includes a plurality of mutually interlinked belts.

3. A round baler according to claim 1, wherein a fixed stop on the tailgate is disposed to engage the first arm of the bell crank.

4. A round baler according to claim 1, wherein the means for increasing a latching force on the latching mechanism includes a tension spring arranged between the pivotal arm and a fixed mounting point on the frame of the baler.

5. In a round baler for bailing harvested crops and having a baling chamber surrounded by a two-part housing of which a front part is rigidly connected to a frame of the baler while a rear part is in the form of a pivotal tailgate, the improvement comprising an actuating mechanism having a plurality of circulating flat-type belts and pressure rollers disposed adjacent one another within a peripheral region of the baling chamber for enabling baling chamber size to vary when pivoted, and a tensioning arm provided with guide rollers, a pivotal arm connected to the tensioning arm, wherein the tensioning arm is pivotally mounted on the frame of the baler via a hydraulic cylinder arranged between the pivotal arm and a first arm of a bell crank, wherein a fulcrum of the bell crank is pivotally mounted on a side wall of the baler's tailgate, and wherein a second arm of the bell crank is connected to a latch which is engageable with a keeper disposed on the frontal part of the housing and means for increasing a latching force on the keeper as a bale in the baling chamber increases in size.

6. A round baler according to claim 5, wherein the actuating mechanism includes a plurality of mutually interlinked belts.

7. A round baler according to claim 5, wherein a fixed stop on the tailgate is disposed to engage the first arm of the bell crank.

8. A round baler according to claim 5, wherein the means for increasing a latching force on the keeper includes a tension spring arranged between the pivotal arm and a fixed mounting point on the frame of the baler.

9. A method for bailing harvested crops utilizing a round baler having a baling chamber surrounded by a two-part housing of which a front part is rigidly connected to a frame of the baler while a rear part is in the form of a pivotal tailgate, the method comprising:

pivoting an actuating mechanism having a plurality of belts and rollers disposed adjacent to one another within the baling chamber to vary baling chamber size;

pivotally mounting a tensioning arm, having guide rollers and connected to a pivotal arm, on the frame of the baler via a hydraulic cylinder arranged between the pivotal arm and a first arm of a bell crank;

interconnecting a latch with a second arm of the bell crank;

engaging the latch with a keeper to lock the two-part housing in a closed position; and increasing a latching force between the latch and the keeper as the size of the bale increases.

10. The method according to claim 9, including the steps of:

pivotally mounting the bell crank on a side wall of the baler's tailgate; and selectively engaging an arm of the bell crank with a frontal part of the housing via the latch.

11. The method according to claim 9, including providing a plurality of mutually interlinked belts to form part of the actuating mechanism.

12. The method according to claim 9, including arranging a fixed stop adjacent the bell crank for engagement when releasing the latch and opening the pivotal tailgate.

13. The method according to claim 9, including arranging a tension spring between the pivotal arm and a fixed mounting point on the frame of the baler for biasing the tensioning arm into a lower end position.

14. A round bailer for bailing harvested crops having a frame, a frontal housing connected to the frame, and a rear housing pivotally connected to the frontal housing, the round bailer including:
- a latch pivotally mounted on the rear housing and operatively engaged with the frontal housing when the rear housing is in a closed position;
- a bell crank pivotally mounted on the rear housing and having first and second arms, the first arm of the bell crank operatively connected to the latch;
- a rotatable tensioning arm operatively connected to the frame;
- a pivotal arm rigidly connected to the tensioning arm for rotation therewith; and
- a hydraulic cylinder having first and second ends, the first end operatively connected to the second arm of the bell crank and the second end operatively connected to the pivotal arm; whereby engagement of the hydraulic cylinder disengages the latch from the frontal housing and pivots the rear housing from the closed to an open position.

15. The round bailer according to claim 14, further including a keeper operatively mounted on the frontal housing.

16. The round bailer according to claim 14, wherein the latch has an arcuate end.

17. The round bailer according to claim 16, wherein the arcuate end of the latch engages a cylindrical keeper mounted on the frontal housing.

18. The round bailer according to claim 14 further including a tension spring mounted to the frame and operatively connected to the pivotal arm.

19. The round bailer according to claim 14, further including a fixed stop rigidly connected to the rear housing adjacent the bell crank.

20. The round bailer according to claim 14, further including a rod intermediate the latch and the first arm of the bell crank.

* * * * *